United States Patent [19]

Schafer

[11] Patent Number: 5,791,046
[45] Date of Patent: Aug. 11, 1998

[54] METHOD OF SLEEVING DAMAGED HEAT EXCHANGER TUBES

[76] Inventor: Bruce W. Schafer, 105 Fleming Mt. Dr., Lynchburg, Va. 24503

[21] Appl. No.: 762,538

[22] Filed: Dec. 9, 1996

Related U.S. Application Data

[62] Division of Ser. No. 305,251, Sep. 13, 1994, Pat. No. 5,606,792.

[51] Int. Cl.⁶ ............................................. B23P 15/26
[52] U.S. Cl. .................. 89/890.031; 29/727; 29/890.043
[58] Field of Search ..................... 29/890.031, 890.043, 29/726, 727, 252, 254, 283

[56] References Cited

U.S. PATENT DOCUMENTS 4,407,150  10/1983  Kelly ............................................ 29/727

5,301,424  4/1994  Snyder ................................... 29/890.043

*Primary Examiner*—Irene Cuda
*Attorney, Agent, or Firm*—Rhodes Coats & Bennett, L.L.P.

[57] ABSTRACT

A method for installing a tube repair sleeve in a tube at a selected location relative to a tube defect or a tube support. The method includes using a hydraulic expander having at least one expandable bladder. The expander includes a stud having at least one conduit formed therein and a plurality of slidable expandable bladders mounted on the stud for radial expansion, each of the bladders in fluid communication with the conduit. A detector means is mounted on the expander and responsive to tube supports and defects in the tube. Finally, a control system is electrically connected with the detector means and operative to control the expansion of the bladder in response to signals received from the detector means.

4 Claims, 3 Drawing Sheets

FIG. 3
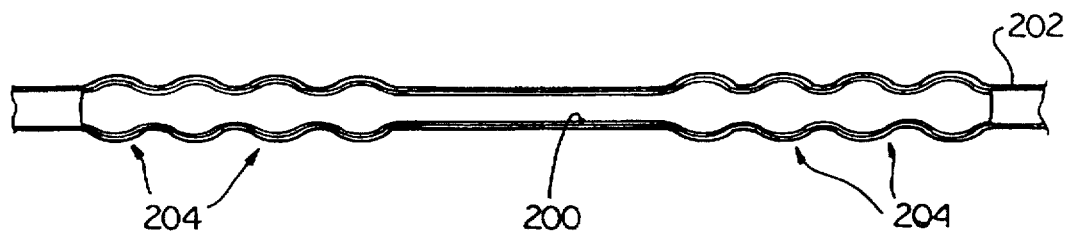
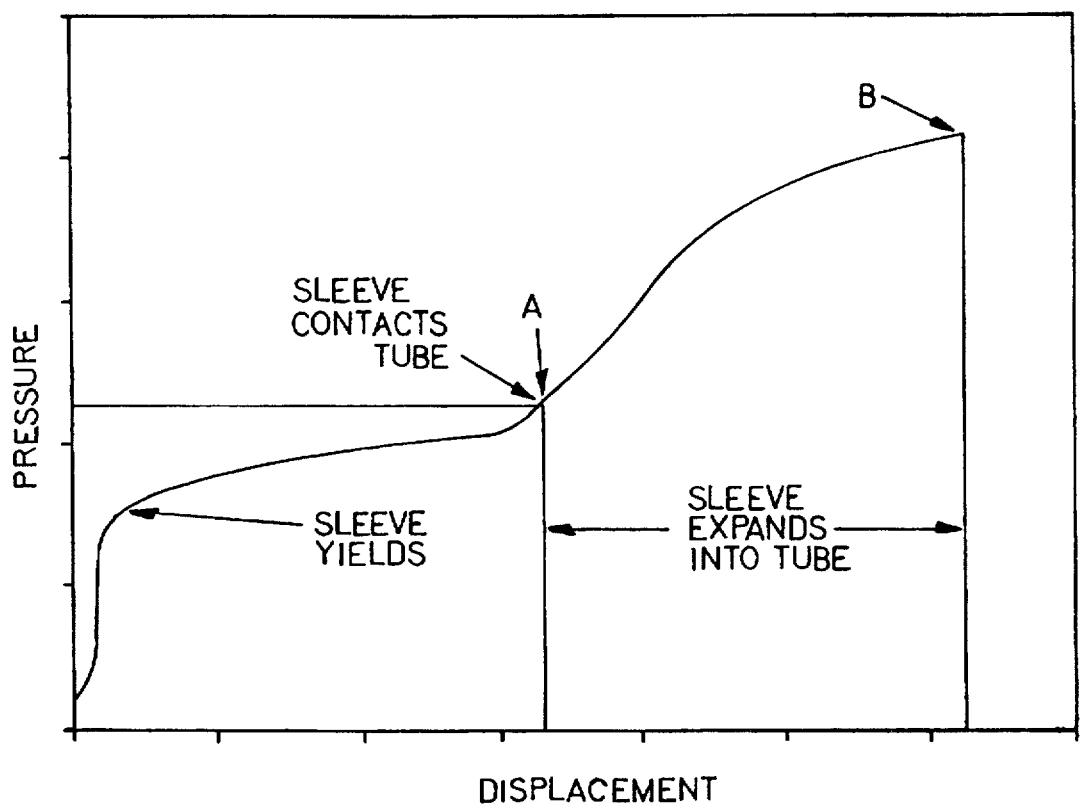
FIG. 4

METHOD OF SLEEVING DAMAGED HEAT EXCHANGER TUBES

This application is a division of application Ser. No. 08/305,251, filed Sep. 13, 1994, now U.S. Pat. No. 5,606,792.

BACKGROUND OF THE INVENTION

1. Field of the Invention

The present invention relates generally to an apparatus for expanding repair sleeves in the tubes of heat exchangers in a nuclear reactor and, more particularly, to an apparatus using an hydraulic expander having multiple bladders and means for accurately detecting the position of a defect within the tube.

2. Description of the Prior Art

The tubes of heat exchangers such as oil coolers, reheaters or feedwater heat exchangers, in particular those of power plants, are subjected to high mechanical and thermal stresses as well as the corrosive action of the fluid which passes therethrough. The severity of the environment causes degradation of the tubes resulting in cracks. The process of replacing tubes, particularly in power plants where down time must be limited, is both expensive and time consuming. Therefore, it is highly desirable to forestall replacement by repairing localized defects.

It is known to temporarily repair defective tubes by plugging them. However, plugging is only a temporary remedy as it reduces the overall heat transfer surface area of the heat exchanger, and thereby materially reduces its efficiency.

Further, it is known to repair a localized tube defect by installing an inner sleeve which spans the defect. The sleeve is inserted through the end of the tube and thereafter expanded near its ends to form a sealing engagement with the tube. Such expansion may be accomplished by mechanical rolling. Further, in order to secure the sleeve until it is roll expanded, it is known to expand the sleeve by means of a mandrel having an orifice for conducting high pressure fluid and a pair of O-rings flanking the orifice. The O-rings form a sealing engagement with the tube such that as fluid is forced into the space between, the wall of the sleeve is forced outwardly. In order for such mandrel designs to reach the desired expansion pressures, the geometry and surface finish of the sleeve must be tightly controlled. Also, when the expansion process is complete, fluid will leak out of the area between the seals and into the heat exchanger tube. This leakage of water could become a problem if the heat exchanger is, for example, radioactively contaminated. An example of an expander using seals is disclosed in U.S. Pat. No. 5,009,002 to Kelly.

To avoid the problems disclosed above, hydraulic expansion mandrels have been developed which provide one or two bladders for receiving the pressurized fluid. The bladders typically have geometries that are difficult to form. For example, U.S. Pat. No. 4,616,392 and U.S. Pat. No. 4,724,595, both issued to Snyder, disclose a bladder having a lip which engages a groove on the mandrel body for sealing purposes.

U.S. Pat. No. 4,724,693, issued to Tedder, discloses a mandrel wherein the end caps have grooves against which the bladder reacts when pressure is applied. In both cases, sophisticated machining must be performed to assure that the bladders will mate with the other parts of the expander.

U.S. Pat. No. 4,513,497, issued to Finch, discloses a tube expanding technique for securing a sleeve within a tube using a tube expanding device which has a distensible, sealed bladder. The technique utilizes a control system which operates to expand the bladder until the sleeve or tube yield point is detected. After this point, the system is either shut down or an additional volume of fluid is added to bring about a small tube outer diameter increase. It has been found that the technique disclosed does not accurately accommodate variations in the properties of the sleeve and/or the expansion mandrel. In particular, the detected yield point may depend upon the tube and sleeve dimensions and the number and length of the bladders on the expander. Finch recognizes this limitation of the apparatus and technique, stating simply that the use of more than one bladder would result in a decrease in the controllability of the expansion due to the sleeve and tube properties variance between the two points being expanded.

Hydraulic expansion also has been used to expand tubes either within or above and below tube sheets or tube support plates to restrain the motion of either the tube or the plate. Typically, a tube is expanded into the tube sheet to close the crevice between the tube and the tube sheet. Deposits accumulate within this crevice, creating the risk of tube damage from impurities in the deposits. To minimize the risk of crevice concerns, the tubes are pressurized and expanded until they contact the tube sheet bore. There is little risk of over expanding the tube since the tube sheet provides a very stiff backing to the tube.

A sleeve also may be used to repair a defective portion of a tube not at a tube sheet by expanding the sleeve into the tube to span the defect with a set of expansions on either side of the tube defect. The tube outer diameter expansion size is generally chosen based on qualification testing that takes into account heat exchanger operating conditions and acceptable leak rates as discussed in more detail below. To best control the expansion sizes, it is not possible to use pressure as a means of controlling the process due to potential variations in the yield strength and size of the tube and sleeve material. In the free-span portion of the tube, where it is not backed by the tube sheet material, the risk of over expanding the tube is great if the expansion process is not tightly controlled. If an overexpansion occurs, the tube may crack either during the expansion operation or during the operation of the heat exchanger due to high stresses in the expanded region.

The acceptable leak rate between the sleeve and tube is an issue within all designs of heat exchangers. However, in radioactively contaminated heat exchangers, the leakage from the contaminated side of the tube to the clean side will result in the contamination of otherwise clean system components. In heat exchangers with dissimilar fluids on each side of the tube, such as an oil cooler, where one side of the tube is filled with water and the other with oil, leakage will result in the mixing of one fluid with the other, a potentially unacceptable situation that may result in damage to other system components. Finally, in pre-heater or feedwater heat exchangers, the leakage of fluid from one side of the tube to the other will result in the loss of efficiency of the unit. Based on the type of heat exchanger to be sleeved, an acceptable leak rate for the sleeve can be determined. In cases where the flow rate through the heat exchanger is high and the risk of contamination or damage to the system components is low, a higher leak rate may be acceptable.

In order to properly locate a sleeve, it is important to accurately locate the center of the sleeve with respect to the defect in the tube. U.S. Pat. No. 4,159,564, issued to Cooper, Jr., discloses the use of an eddy current coil to detect the presence of the end of the tube sheet. Because the device disclosed uses the tube to return the eddy current signal to a monitoring device, there is a significant amount of electrical noise due to both stray currents within the tube and the electrical connection between the coil and the tube. With this high electrical noise, it is not possible to detect small tube defects. Moreover, in a typical heat exchanger, the inside of the tubes are typically coated with a layer of oxides or other deposits, creating a non-uniform electrical connection. The eddy current device described the patent to Cooper, Jr., could only reliably be used where the tubes were cleaned prior to sleeving, a man-power intensive effort.

Thus, there exists the need for a hydraulic sleeve expander for installing sleeves in the tubes of a heat exchanger which dispenses with the need for mechanical rolling and other operations for sealing the ends of the sleeves. Further, there exists a need for such an expander which is versatile and relatively inexpensive to manufacture while, at the same time, is capable of accurately locating a defect in a tube and positioning a sleeve relative to the defect.

SUMMARY OF THE INVENTION

The present invention is directed to a hydraulic expander assembly for installing a tube repair sleeve in a tube at a selected location relative to a tube defect or a tube support. The apparatus includes a hydraulic expander having at least one expandable bladder and adapted to receive the sleeve thereon. The expander includes a stud having at least one conduit formed therein and a plurality of slidable expandable bladders mounted on the stud for radial expansion, each of the bladders in fluid communication with the conduit. A detector means is mounted on the expander and responsive to tube supports and defects in the tube. Finally, a control system is electrically connected with the detector means and operative to control the expansion of the bladder in response to signals received from the detector means.

Accordingly, one aspect of the present invention is to provide a hydraulic expander assembly for installing a tube repair sleeve in a tube at a selected location relative to a tube defect or a tube support. The apparatus includes: (a) a hydraulic expander having at least one expandable bladder and adapted to receive the sleeve thereon; and (b) detector means mounted on the expander and responsive to tube supports and defects in the tube.

Another aspect of the present invention is to provide a hydraulic expander for installing a tube repair sleeve in a tube. The apparatus includes: (a) a stud, the stud having at least one conduit formed therein; and (b) a plurality of expandable bladders mounted on the stud for radial expansion, each of the bladders in fluid communication with the conduit.

Still another aspect of the present invention is to provide a hydraulic expander assembly for installing a tube repair sleeve in a tube at a selected location relative to a tube defect or a tube support. The apparatus includes: (a) a hydraulic expander having at least one expandable bladder and adapted to receive the sleeve thereon; the expander including: (i) a stud, the stud having at least one conduit formed therein; and (ii) a plurality of expandable bladders mounted on the stud for radial expansion, each of the bladders in fluid communication with the conduit; (b) detector means mounted on the expander and responsive to tube supports and defects in the tube; and (c) a control system electrically connected with the detector means and operative to control the expansion of the bladder in response to signals received from the detector means.

These and other aspects of the present invention will become apparent to those skilled in the art after a reading of the following description of the preferred embodiment when considered with the drawings.

BRIEF DESCRIPTION OF THE DRAWINGS

FIG. 3 is a cross-sectional view of the sleeve installed within a tube as installed by an expander having eight bladders; and FIG. 4 is a graphical representation of pressure within the expander of the present invention as measured by the pressure transducer versus the displacement of the fluid applying piston as measured by the displacement transducer during the sleeve installation process.

DESCRIPTION OF THE PREFERRED EMBODIMENTS

Figure 1:
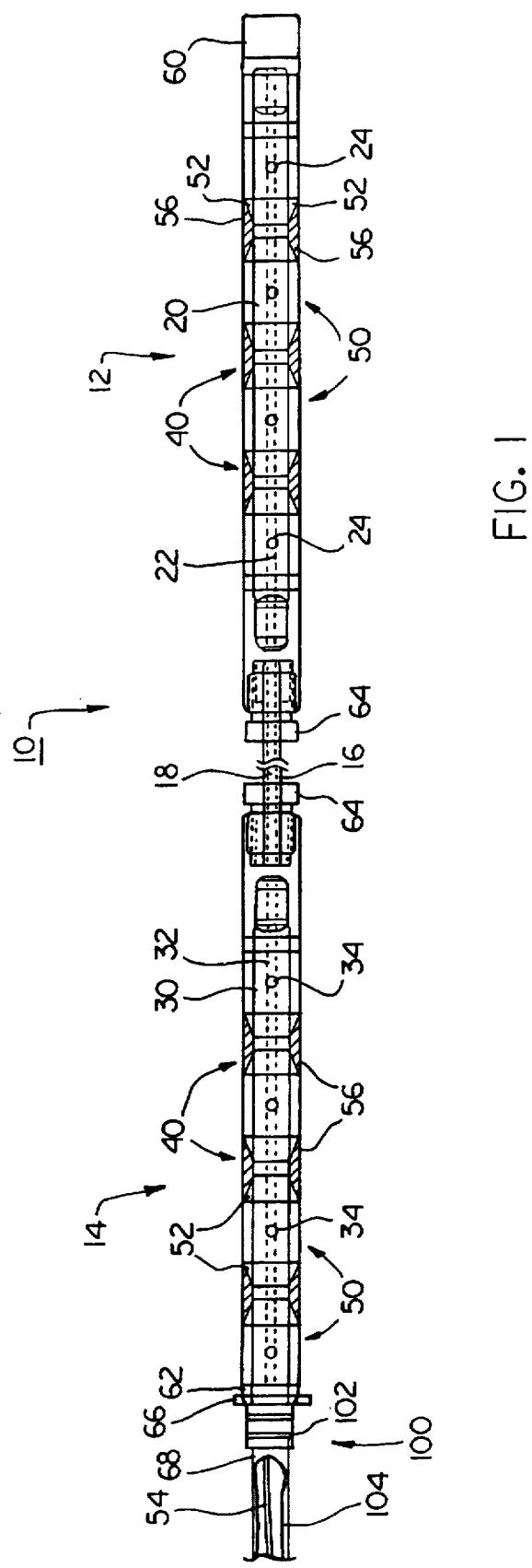
FIG. 1 is a side cross-sectional, fragmentary elevational view of a hydraulic sleeve expander constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a hydraulic sleeve expander, generally designated 10, constructed according to the present invention is shown.

Expander 10 is designed to install a sleeve 200 in a tube 202 such that the sleeve is secured in the tube at expansion zones 204, as shown in FIG. 3. Sleeve 200 is preferably constructed of a material which is less susceptible to the attack mechanism acting on tube 202. Sleeve 200 may also be coated with a very hard material to improve its erosion resistance in the event that water or steam cutting is damaging the tube.

Turning now to expander 10 in more detail, expander 10 includes upper assembly 12 and lower assembly 14 joined by flexible connector tube 16. Upper assembly 12 and lower assembly 14 include first stud 20 and second stud 30, respectively. First stud 20 and second stud 30 are secured to opposite ends of connector tube 16 by intermediate caps 64. About each stud are positioned one or more resilient, high strength, plastic bladders 50 and mid-span spacers 40 separating respective bladders.

Bladders 50 and spacers 40 are slidably mounted on the studs without sealing thereto such that they float and are held thereon by intermediate caps 64, base cap 62, and terminal cap 60. Preferably, two or more bladders 50 are provided on each stud. Hard stop 66 is secured to base cap 62 and serves to locate the end of the repair sleeve. Sheath 68 extends from hard stop 66 and protects high pressure tube 54 and leads 104 (as discussed below) as well as providing means for maneuvering expander 10.

Studs 20, 30 are provided with axially extending fluid conduits 22, 32 and connector tube 16 is provided with axially extending conduit 18, thereby providing fluid communication from high pressure tube 54 to terminal cap 60. Radially extending conduits 24, 34 provide fluid communication between conduits 22, 32 and bladders 50. Bladders 50 have tapered ends 52 which are complementary to annular tapered ends 56.

Expander 10 is connected to hydraulic control system 70 for fluid communication therewith by high pressure tubing 54, thereby forming a hydraulic expansion system. Control system 70 includes control computer 80 which is electrically connected to displacement transducer 72, fluid supply piston 76, and pressure transducer 74. The latter three components are preferably housed in box 71. Control computer 80 is operative to receive and interpret electrical signals generated by transducers 72, 74 and is further operative to actuate in each direction and deactuate piston 76.

Figure 2:
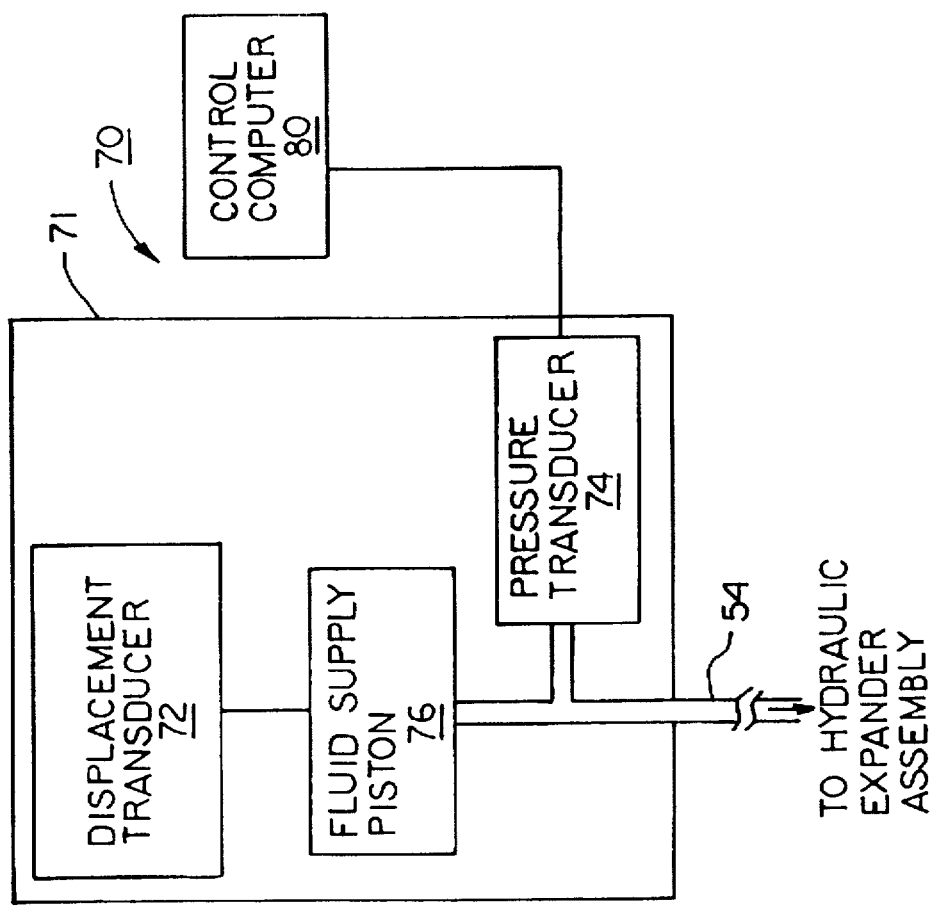
FIG. 2 is a schematic diagram of the detecting and control systems of the hydraulic sleeve expander system according to the present invention.
Figure 2:
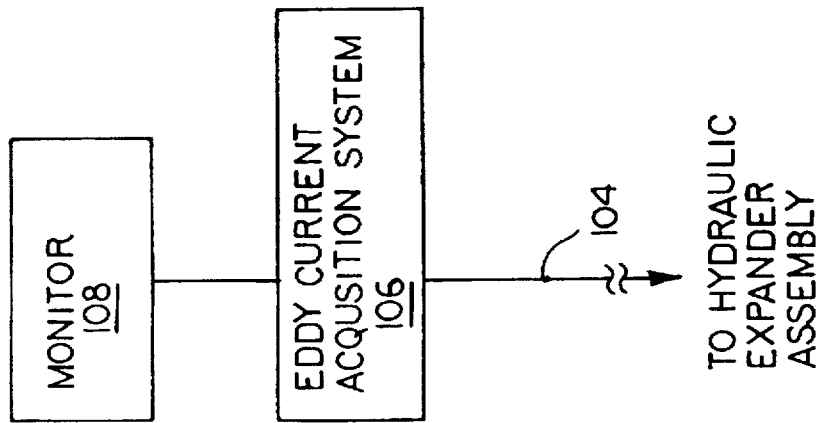

Eddy current detector 100, preferably a bobbin probe, is provided at the trailing end of expander 10. Detector 100 includes coils 102 which electrically communicate with eddy current acquisition system 106 as shown in FIG. 2 via leads 104, preferably coaxial cable. Eddy current acquisition system 106 is preferably connected to a display monitor 108.

In general, fluid supply piston 76 pressurizes or depressurizes the fluid in tube 54. Piston 76 is controlled by control computer 80, preferably including a display monitor, which is responsive to input received from displacement transducer 72 and pressure transducer 74. Pressure transducer 74 measures the pressure in tube 54, which corresponds to the pressure in bladders 50. Displacement transducer 72 measures the displacement of piston 76 which corresponds to the volume of fluid added to the system.

When the system is pressurized, bladders 50 fill with fluid, causing them to swell and radially expand. Bladders 50 expand by plastic deformation such that tapered ends 52 maintain an interference fit with tapered ends 56. The tapered ends of the bladders in conjunction with tapered ends 56 serve to maintain a sufficient seal for the high pressure operation as well as to smooth the expansion transition. As bladders 50 swell, they contact the inner diameter of sleeve 200, creating an expansion of the sleeve. This process continues until the sleeve contacts tube 202. At this point, the sleeve and tube expand together until the required volume of fluid is added to the system. The system is depressurized by withdrawing piston 76. When the system is depressurized, the bladders 50 return to their original shape so that expander 10 can be easily removed from sleeve 200 after expansion.

Eddy current detector 100 is constructed such that it creates an electromagnetic field in the tube when in operation. Preferably, detector 100 consists of coil 102 of copper wire wound circumferentially around a plastic insert. As expander 10 is passed through tube 202, eddy current acquisition system 106 monitors the electrical signal returning from detector 100. When the coil passes over either a tube defect or passes near a tube support plate, the signal on the acquisition system screen changes, alerting the operator of the presence of either a defect or support plate. By the orientation of the signal on the data screen, the operator will know the type and size of the defect that the coil has just passed over.

Expander 10 of the present invention allows for a substantial amount of versatility in applications. By increasing the number of bladders 50 and thereby the number of expanded areas on each end of the sleeve, the leak rate between the tube and the sleeve can be reduced because the fluid has a more torturous leak path. However, as the number of bladders increases, the overall length of the sleeve also increases. The expander of the present invention may be modified for any number of bladders, merely by changing the lengths of the studs, the number of bladders, and the number of mid-span spacers. Thus, the operator many adapt the expander to his specific needs, giving suitable relative weights to the number of expansion zones 204 needed and the overall sleeve length allowed.

In order to expand the sleeve on either side of a defect, the expander connector can be made as long as necessary depending on the length of the sleeve to be installed. The length of the sleeve desired is determined by the position of the defect within the tube. The expander connector may be easily replaced during expander use. Further, the flexibility of the connector tube eases removal of the expander from the tube after the sleeve has been installed. It also will be appreciated that because bladders are used, the sleeve geometry does not need to be controlled as tightly during sleeve fabrication and fluid used in the expansion process is not leaked into the tube.

Sleeves may be installed in tubes using the apparatus as described above using the method according to the present invention as follows. The process of the present invention is particularly well-suited for repairing tube defects when expansion zones must be positioned away from a tube support plate. The expansion process is controlled by the point at which the sleeve contacts the tube. Past this point, an additional volume of fluid is added to the system, regardless of the tube response, to achieve the proper expansion size. The acceptable range of tube outer diameter expansions will vary for each application of the sleeve, depending on sleeve geometry and the heat exchanger operating conditions.

Preferably, the volume of fluid which must be added to the system after the sleeve has contacted the tube in order to achieve the proper expansion is determined during the qualification of the heat exchanger sleeve. This value will be different for each sleeve design, depending on the number and length of the bladders on the expander and the tube and sleeve dimensions.

During the expansion process, the point at which the sleeve contacts the tube is the first important process control point and is shown as "A" in FIG. 4. A pre-set value for the change in slope is input into control computer 80 such that when this point is reached, control computer 80 automatically registers contact. From this point on the process is purely displacement controlled, and a pre-set additional volume of fluid or piston displacement is injected into expander 10. When this volume of fluid is completely placed into expander 10, point "B" on FIG. 4, the system is depressurized and the expander removed from the sleeve and tube.

The following process for installing a sleeve using the hydraulic expander system of the present invention is preferred. First, expander 10 is assembled as desired for the particular application, selecting the appropriate connector tube length and number of bladders and spacers. Sleeve 200 is then installed on expander 10, positioning one end of sleeve 200 against hard stop 66. Fluid supply piston 76 is then actuated to pressurize bladders 50 such that they radially expand into contact with the inner diameter of the sleeve. Bladders 50 are expanded such that they form an interference fit with sleeve 200 strong enough to hold the sleeve in place during insertion into the tube, but without deforming the sleeve. Expander 10 and sleeve 200 mounted thereon are inserted into heat exchanger tube 202 using expansion sheath 68. As expander 10 and sleeve 200 are inserted into the tube, eddy current detector 100 provides input to acquisition system 106 which system 106 in turn interprets and outputs to display monitor 108. The operator observes monitor 108 to locate the defect. Once the defect has been located, the operator pulls back on expansion sheath 68 a pre-set distance to center the sleeve over the defect.

Control computer 80 then begins the expansion process by actuating fluid supply piston 76 to force fluid into expander 10. Meanwhile, control computer 80 monitors and records the pressure of the system and the piston displacement. Preferably, control computer 80 displays the expansion process on the monitor. As the pressure increases, the change in the slope of the pressure verses displacement data is monitored (see FIG. 4). When sleeve 200 has contacted tube 202, the slope will begin to increase rapidly. The pressure at which this will occur varies with the tube and sleeve dimensions and yield strength. Once the sleeve has contacted the tube, control computer 80 actuates fluid supply piston 76 to force an additional, prescribed amount of fluid into the system. This amount is based on the qualification results and will differ for varying sleeve, tube, and expander properties. After proper piston displacement is reached, the system is depressurized and essential data may be stored to computer disk. The expander is then removed from the sleeve and tube, and the process may be repeated.

Certain modifications and improvements will occur to those skilled in the art upon a reading of the foregoing description. By way of example, the eddy current coils may be provided in the upper assembly of the expander, such that when a defect is detected, the expander may be moved forward a pre-set distance in order to properly locate the sleeve. Also, the actual number of bladders, the use of the hard stop and the type of fluid used could be modified as needed for a particular application. It should be understood that all such modifications and improvements have been deleted herein for the sake of conciseness and readability but are properly within the scope of the following claims.

I claim:

1. A method for installing a tube repair sleeve in a tube at a selected location relative to a tube defect or a tube support using a hydraulic expander assembly having an expandable bladder and a detector means, said method comprising the steps of:
   (a) installing the sleeve on the expander assembly such that the bladder is disposed interiorly of the sleeve;
   (b) inserting the expander assembly and sleeve into the tube;
   (c) locating the defect or tube support using the detector means;
   (d) selectively positioning the expander assembly and the sleeve relative to the defect or tube support; and
   (e) expanding the bladder so as to deform the sleeve and the tube, thereby forming expansion zones at which the sleeve and the tube are in sealing engagement.

2. The method according to claim 1, wherein said step of locating the defect or tube support includes monitoring an electrical signal generated by an eddy current coil and wherein said step of positioning includes displacing the expander assembly and sleeve relative to the tube responsive to the signal.

3. A method for installing a tube repair sleeve in a tube at a selected location relative to a tube defect or a tube support using a hydraulic expander assembly having an expandable bladder and a detector means, said method comprising the steps of:
   (a) installing the sleeve on the expander assembly such that the bladder is disposed interiorly of the sleeve;
   (b) inserting the expander assembly and sleeve into the tube;
   (c) locating the defect or tube support using the detector means;
   (d) selectively positioning the expander assembly and the sleeve relative to the defect or tube support; and
   (e) expanding the bladder so as to deform the sleeve and the tube, thereby forming expansion zones at which the sleeve and the tube are in sealing engagement, said expansion step including expanding the bladder of the hydraulic expander assembly so as to deform a sleeve mounted thereon and a surrounding tube, thereby forming expansion zones at which the sleeve and the tube are in sealing engagement, said expansion step including:
      (i) expanding the bladder by forcing fluid into the expander assembly until the outer surface of the sleeve is expanded into contact with the inner surface of the tube; and
      (ii) injecting a selected additional volume of fluid into the expander assembly so as to expand the bladder and thereby the sleeve and the tube a prescribed amount.

4. The method according to claim 3, wherein said step of locating the defect or tube support includes monitoring an electrical signal generated by an eddy current coil and wherein said step of positioning includes displacing the expander assembly and sleeve relative to the tube responsive to the signal.

\* \* \* \* \*